United States Patent
Kondo et al.

(10) Patent No.: US 6,718,073 B1
(45) Date of Patent: Apr. 6, 2004

(54) ARITHMETIC DEVICE, AND CONVERTER, AND THEIR METHODS

(75) Inventors: Tetsujiro Kondo, Tokyo (JP); Takashi Horishi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/555,245
(22) PCT Filed: Sep. 30, 1999
(86) PCT No.: PCT/JP99/05384
§ 371 (c)(1), (2), (4) Date: Jul. 17, 2000
(87) PCT Pub. No.: WO00/19724
PCT Pub. Date: Apr. 6, 2000

(30) Foreign Application Priority Data

Sep. 30, 1998 (JP) .......................................... 10/278593

(51) Int. Cl.⁷ .............................. G06T 5/00; H04N 7/01
(52) U.S. Cl. ......................... 382/299; 382/224; 382/261
(58) Field of Search ................................. 382/300, 299, 382/224, 261, 264; 348/458, 208.13, 538, 443, 441

(56) References Cited

U.S. PATENT DOCUMENTS

| 5,379,072 A | 1/1995 | Kondo et al. |
| 5,488,618 A | 1/1996 | Kondo et al. |
| 5,666,164 A | 9/1997 | Kondo et al. |
| 5,748,235 A | * 5/1998 | Kondo et al. ............. 348/222.1 |
| 5,852,470 A | * 12/1998 | Kondo et al. ................ 348/448 |
| 5,946,044 A | 8/1999 | Kondo et al. |
| 5,966,183 A | * 10/1999 | Kondo et al. ................ 348/458 |
| 6,181,382 B1 | * 1/2001 | Kieu et al. .................. 348/459 |
| 6,285,714 B1 | * 9/2001 | Kawaguchi et al. ... 375/240.21 |

FOREIGN PATENT DOCUMENTS

| EP | 0 912 045 | 4/1999 | |
| JP | 0 708 5267 | 3/1995 | |
| JP | 8-46934 | 2/1996 | |
| JP | 08307835 A | * 11/1996 | ............ H04N/7/01 |
| JP | 8-317347 | 11/1996 | |
| JP | 1 001 1583 | 1/1998 | |
| JP | 10-112843 | 4/1998 | |
| JP | 10-112844 | 4/1998 | |
| JP | 10-191318 | 7/1998 | |
| JP | 1 031 3251 | 11/1998 | |

OTHER PUBLICATIONS

Pohjala et al. "Line Rate Upconversion in IDTV Applications." IEEE Trans. on Consumer Electronics, vol. 37, No. 3, Aug. 1991, pp. 309–312.*

* cited by examiner

Primary Examiner—Jon Chang
(74) Attorney, Agent, or Firm—Frommer Lawrence & Haug LLP; William S. Frommer

(57) ABSTRACT

In an image data conversion unit, image quality can be further improved as compared with a conventional unit. Prediction data are generated from teacher image data (HD) corresponding to second image data by using a plurality of filters (F1 to F4) having pass-bands different from each other and thereby, the second image data can be generated by using prediction data corresponding to characteristics of first image data, which enables further improvement of image quality as compared with a conventional case.

40 Claims, 14 Drawing Sheets

DOWN-FILTER F1

DOWN-FILTER F2

DOWN-FILTER F3

DOWN-FILTER F4

ARITHMETIC DEVICE, AND CONVERTER, AND THEIR METHODS

TECHNICAL FIELD

The present invention relates to an arithmetic unit and conversion unit and methods thereof, and is suitably applied to a conversion unit for converting first data into second data with higher quality than the first data and to an arithmetic unit for computing prediction coefficients which are used for the conversion processing.

BACKGROUND ART

Under the situation where various kinds of digital units are available, a signal conversion unit that performs signal conversion is necessary for connecting units having different signal formats from each other. For example, in the case of displaying image data with low resolution on a monitor having high resolution, an image data conversion unit is necessary for producing image data with high resolution from image data with low resolution through format conversion. So far, an image data conversion unit of this kind has produced image data with high resolution through pixel interpolation in which frequency interpolation processing is performed on image data with low resolution by using an interpolation filter.

As an image data conversion unit, an up-converter adopting classification adaptive processing is used, in which image data with low resolution is classified into classes in accordance with a signal level distribution of pixels, and then prediction coefficients corresponding to the respective classes are read out from a memory in which the prediction coefficients are stored in order to obtain image data with high resolution from the prediction coefficients and the image data with low resolution by a predictive operation.

The prediction coefficients, which are stored in the memory, are generated in advance by data processing called learning. A learning circuit for generating the prediction coefficients, down-converts image data with high resolution as a teacher image with a digital filter to generate image data with low resolution as a pupil image and further generates the prediction coefficients by performing learning using the image data with high resolution and the image data with low resolution.

By the way, in the case where image data with high resolution has a plurality of signal characteristics, it is desirable that a frequency characteristic of the digital filter is changed according to each signal characteristic. That is, when image data with high resolution is generated from image data with low resolution, a digital filter whose frequency characteristic improves resolution is desirable for a still image portion since a resolving power of a human eye is improved for the still image portion, whereas a digital filter whose frequency characteristic suppresses improvement of resolution is desirable for a moving image portion since an unnecessary signal component in a high band is moved to deteriorate image quality as image data resolution is improved.

Accordingly, in the case where image data with high resolution is down-converted to image data with low resolution using one digital filter to generate prediction coefficients, prediction coefficients corresponding to the respective signal characteristics cannot be generated if the image data with high resolution has a plurality of signal characteristics. As a result, generating image data with high resolution from image data with low resolution cause a problem in which improvement of image quality is hindered.

Further, some cases may be better to change the frequency characteristics of a digital filter because of not only still image portions and moving image portions but also other factors.

DISCLOSE OF INVENTION

The present invention has been made in view of the above problem and it is an object of the present invention to provide an arithmetic unit and method for computing prediction coefficients which are used for conversion processing further matching the characteristics of first data as compared with conventional units and a conversion unit and method for generating second data using the prediction coefficients obtained by the arithmetic unit.

In order to solve the above problems, the present invention provides an arithmetic unit for computing prediction coefficients which are used to convert first data into second data having higher quality than the first data. The arithmetic unit comprises a class determining section for classifying teacher image data having higher quality than the first image data into a plurality of classes based on its characteristics, a pupil image data generating section for generating pupil image data having the same quality as the first image data by performing filtering processing different in each of classes determined by the class determining section, on the teacher image data, and a prediction coefficient generating section for generating prediction coefficients based on the pupil image data and the teacher image data.

The pupil image data matching the characteristics of the first image data and the teacher image is generated by performing filtering processing different in each class on the teacher image data. And the prediction coefficients matching the characteristics of the first image data and the teacher image data are generated by generating the prediction coefficients based on the pupil image data and the teacher image data.

Since the conversion unit uses the prediction coefficients based on the characteristics of the first image data, it can perform the conversion processing matching the characteristics of the first image data when converting the first image data into the second image data.

BEST MODE FOR CARRYING OUT THE INVENTION

An embodiment of the present invention will be described below with reference to the accompanying drawings ia detail.

(1) Principle of Classification Adaptive Processing

Figure 1:
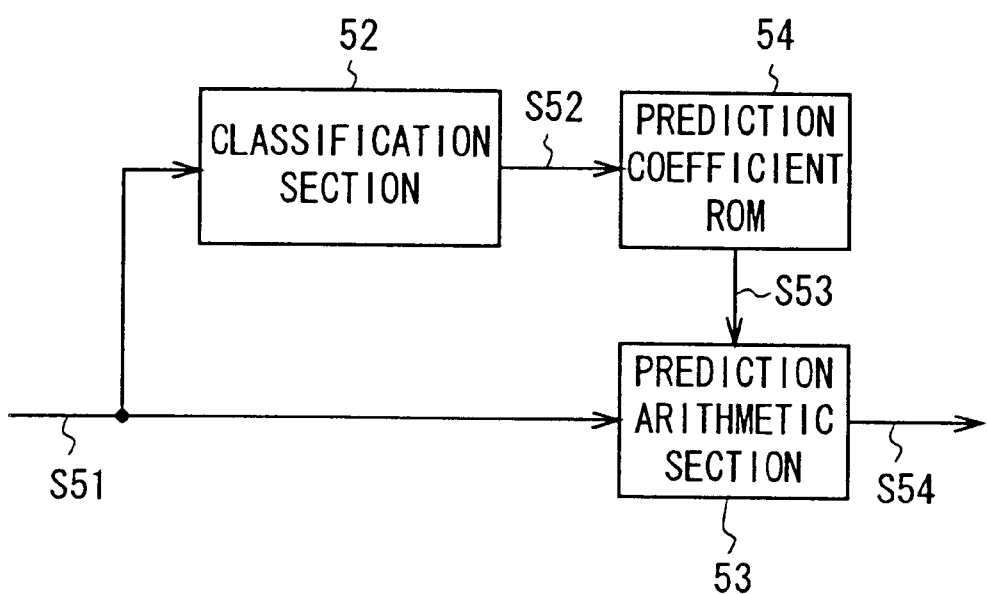
FIG. 1 is a block diagram showing a configuration of an up-converter.
Figure 2:
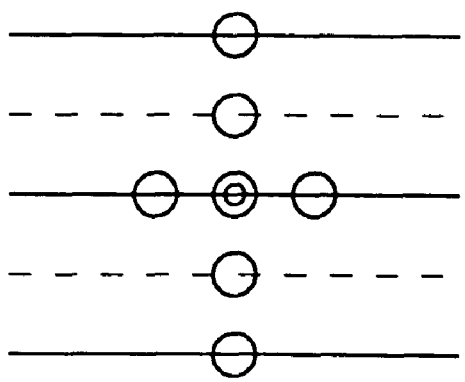
FIG. 2 is a schematic diagram showing an example of arrangement of class taps.

FIG. 1 shows a circuit configuration of an up-converter 51 that performs classification adaptive processing. In the up-converter 51, SD (Standard Definition) image data S51 comprised of, for example, an 8-bit PCM (Pulse Code Modulation) data that is supplied from an outside source is inputted to a classification section 52 and a prediction arithmetic section 53. The classification section 52, as shown in FIG. 2, sets a total of seven pixels (taps) composed of a remarkable pixel and a plurality of neighboring pixels around the remarkable pixel out of the SD image data S51 as pixels for classification (hereinafter, referred to as class taps) to generate a class code S52 on the basis of a signal level distribution thereof. In the figure, a solid line indicates a first field and a broken line indicates a second field.

As methods of generating the class code S52 by the classification section 52, the following methods can be considered; a method in which a PCM data is directly used (that is, a PCM data is used as the class data S52 as it is); and a method in which the number of classes is reduced using a data compression method such as ADRC (Adaptive Dynamic Range Coding). However, the method in which the PCM data is used as the class code S52 as it is has a problem in which the circuit size is enlarged because seven taps of PCM data out of eight taps are used as class taps and the number of classes is an enormous number of $2^{56}$.

Accordingly, the classification section 52 performs data compression (that is, re-quantization) such as ADRC in order to reduce the number of classes. A classification method by the ADRC obtains an ADRC code from several taps in a neighboring region around a remarkable pixel using the following equation (1):

$$C_i = \frac{x_i - \text{MIN}}{\frac{DR}{2^k}} \tag{1}$$

and generates the class code S52 based on the ADRC code. Here, $C_i$ indicates an ADRC code, $X_i$ indicates an input pixel value of each class tap, MIN indicates the minimum pixel value of the input pixel values of the class taps residing in a block in the ADRC, DR indicates a dynamic range (a difference between the maximum pixel value and the minimum pixel value) in the region, and k indicates the number of re-quantized bits.

That is, the classification according to ADRC is that a step size of quantization is calculated according to the number of re-quantization bits from the dynamic range in the region and a pixel value obtained by subtracting the minimum pixel value from an input pixel value is re-quantized according to a step size of quantization. For example, in the case where one-bit ADRC is performed in which each class tap is re-quantizated to one bit for seven taps in the region, each input pixel value of seven taps is adaptively quantized to one bit based on the dynamic range in the region, as a result, the input pixel values of seven taps are reduced to seven-bit data. Therefore, the number of classes can be reduced down to 128 classes as a whole. The one-bit ADRC is disclosed in Japanese Patent Laid Open No. 87481/95 and in U.S. Pat. No. 5,488,618.

Figure 3:
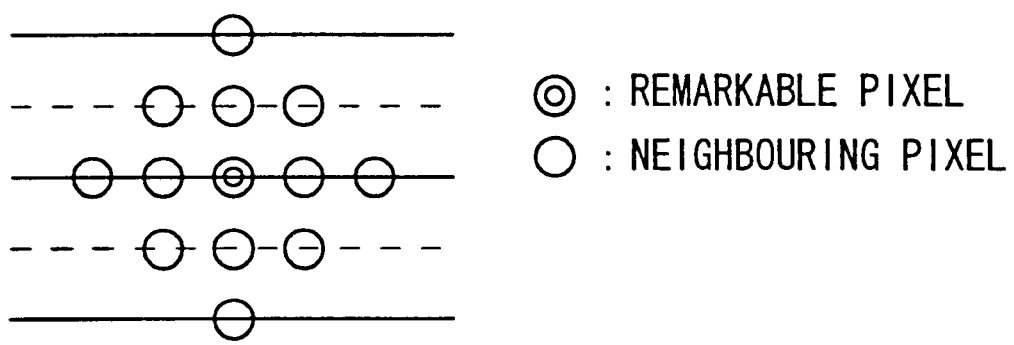
FIG. 3 is a schematic diagram showing an example of arrangement of prediction taps.

Returning to FIG. 1, a prediction coefficient ROM (Read Only Memory) 54 stores prediction coefficient data S53 respectively corresponding to classes generated in advance by a learning circuit 60, which will be described later, reads out prediction coefficient data S53 corresponding to a class code S52 supplied from the classification section 52 and sends it out to the prediction arithmetic section 53. The prediction arithmetic section 53, as shown in FIG. 3 for example, selects a total of thirteen taps comprised of a remarkable pixel and a plurality of neighboring pixels around the remarkable pixel as pixels for prediction arithmetic (hereinafter, referred to as prediction taps) from the SD image data S51 input from an outside source, and performs a product-sum operation expressed by the following equation (2) in the form of a linear combination:

$$x' = \sum_{i=1}^{n} W_i \times x_i = w_1 \times x_1 + \ldots + w_n \times x_n \tag{2}$$

using pixel values of the prediction taps and the prediction coefficient data S53 and thereby, generates HD image data S54 that is a collection of HD pixels, which are not existent in the prediction taps, and outputs the data to an outside destination. Here, where x' indicates an HD pixel value, $x_i$ indicates a pixel value of each prediction tap, $w_i$ indicates a prediction coefficient and n indicates the number of prediction taps, which assumes 13 in this case.

Figure 4:
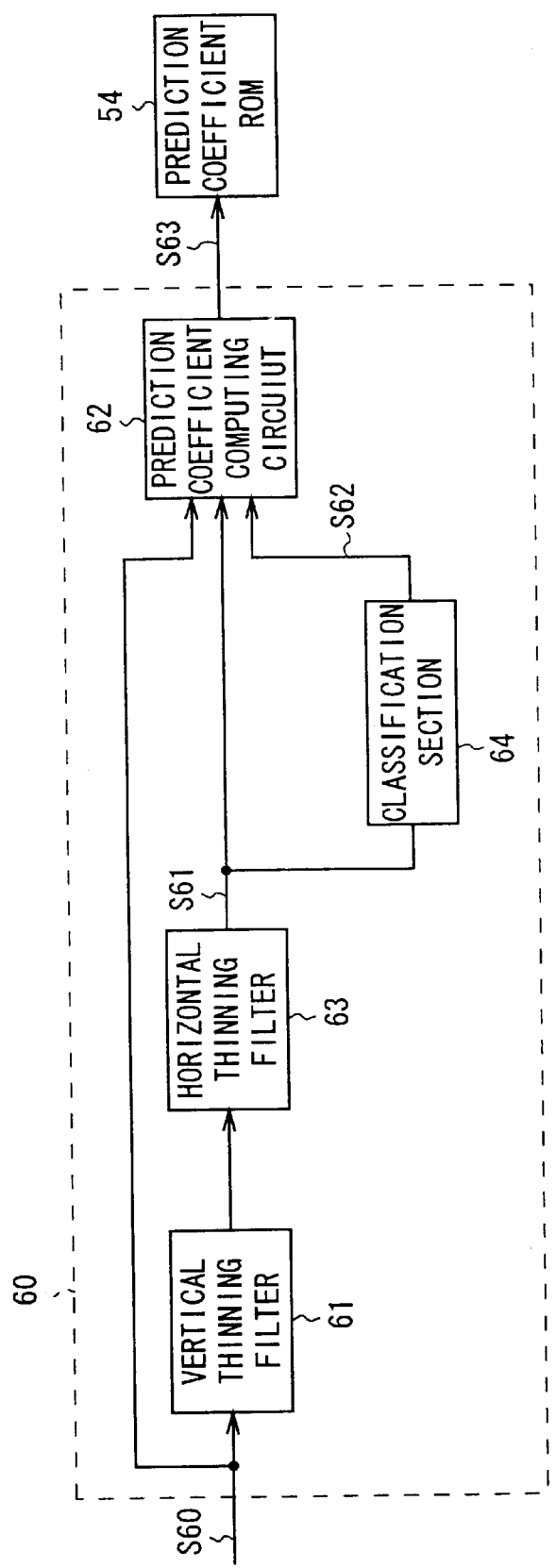
FIG. 4 is a block diagram showing a configuration of a learning circuit.

FIG. 4 shows a circuit configuration of the learning circuit 60 that generates prediction coefficient data stored in the prediction coefficient ROM 54, in which the learning circuit 60 generates prediction coefficient data in advance and then stores it in the prediction coefficient ROM 54. In the learning circuit 60, HD image data S60 as a teacher signal is input to a vertical thinning filter 61 and a prediction coefficient computing circuit 62. The learning circuit 60 generates SD image data S61 as a pupil signal by thinning out the HD image data S60 through the vertical thinning filter 61 and a horizontal thinning filter 62, and the SD image data S61 is input to a classification section 64 and the prediction coefficient computing circuit 62.

The classification section 64 has a configuration similar to the classification section 52 of the up-converter shown in FIG. 1, selects class taps from the SD image data S61, generates a class code S62 based on a signal level distribution and thereafter, sends it out to the prediction coefficient computing circuit 62. The prediction coefficient computing circuit 62 computes a prediction coefficient according to a class indicated by the class code S62, for each class on the basis of the HD image data S60 and the SD image data S61, and the resultant prediction coefficient data S63 is stored into the prediction coefficient ROM 54.

In this case, the prediction coefficient computing circuit 62 obtains a prediction coefficient w of the above-described equation (2) using a method of least squares. To be concrete, the prediction coefficient computing circuit 62 collects data so as to generate the following equation (3) called an observation equation:

$$XW = Y \quad (3)$$

, providing that $x = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}$, $W = \begin{bmatrix} w_1 \\ w_2 \\ \cdots \\ w_n \end{bmatrix}$ and $Y = \begin{bmatrix} y_1 \\ y_2 \\ \cdots \\ y_m \end{bmatrix}$ , where X indicates an SD pixel value, W indicates a prediction coefficient, Y indicates an HD pixel value, m is the number of learning data showing the number of HD pixels to be predicted and n is the number of prediction taps.

Then, the prediction coefficient computing circuit 62 generates a residual equation shown by the following equation (4) based on the equation (3):

$$XW = Y + E \quad (4)$$

providing that $E = \begin{bmatrix} e_1 \\ e_2 \\ \cdots \\ e_m \end{bmatrix}$.

Accordingly, from the equation (4), it is understood that the prediction coefficients $w_i$ are the optimal value when the following equation (5) shows the minimum value:

$$\sum_{i=1}^{m} e_i^2 \quad (5)$$

that is, the prediction coefficients $w_i$ are computed so as to satisfy the following equation (6):

$$e_1 \frac{\partial e_1}{\partial w_i} + e_2 \frac{\partial e_2}{\partial w_i} + \ldots + e_m \frac{\partial e_m}{\partial w_i} = 0 \quad (6)$$

Therefore, the prediction coefficient computing circuit 62 is only required to compute $w_1, w_2, \ldots, w_n$ that satisfy the equation (6) having n parts and the following equations (7) are obtained from the above-shown equation (4):

$$\frac{\partial e_i}{\partial w_1} = x_{i1}, \frac{\partial e_i}{\partial w_2} = x_{i2}, \ldots, \frac{\partial e_i}{\partial w_n} = x_{in} \quad (7)$$

and the following equations (8) are further obtained from the equations (6) and (7):

$$\sum_{i=1}^{m} e_i x_{i1} = 0, \sum_{i=1}^{m} e_i x_{i2} = 0, \ldots, \sum_{i=1}^{m} e_i x_{in} = 0 \quad (8)$$

The prediction coefficient computing circuit 62 generates a normal equation expressed by the following equation (9) from the equations (4) and (8):

$$\left(\sum_{i=1}^{m} x_{j1} x_{j1}\right) w_1 + \left(\sum_{i=1}^{m} x_{j1} x_{j2}\right) w_2 + \ldots + \left(\sum_{i=1}^{m} x_{j1} x_{jn}\right) w_n = \left(\sum_{i=1}^{m} x_{j1} x_j\right) \quad (9)$$

$$\left(\sum_{i=1}^{m} x_{j2} x_{j1}\right) w_1 + \left(\sum_{i=1}^{m} x_{j2} x_{j2}\right) w_2 + \ldots + \left(\sum_{i=1}^{m} x_{j2} x_{jn}\right) w_n = \left(\sum_{i=1}^{m} x_{j2} y_j\right)$$

$$\left(\sum_{i=1}^{m} x_{jn} x_{j1}\right) w_1 + \left(\sum_{i=1}^{m} x_{jn} x_{j2}\right) w_2 + \ldots + \left(\sum_{i=1}^{m} x_{jn} x_{jn}\right) w_n = \left(\sum_{i=1}^{m} x_{jn} y_j\right)$$

In this way, the prediction coefficient computing circuit 62 generates a normal equation constituted of simultaneous equations of the same degree as the number n of prediction taps and computes each of the prediction coefficients $w_i$ by solving the normal equation using a sweeping-out method (an elimination method of Gauss Jordan).

Figure 5:
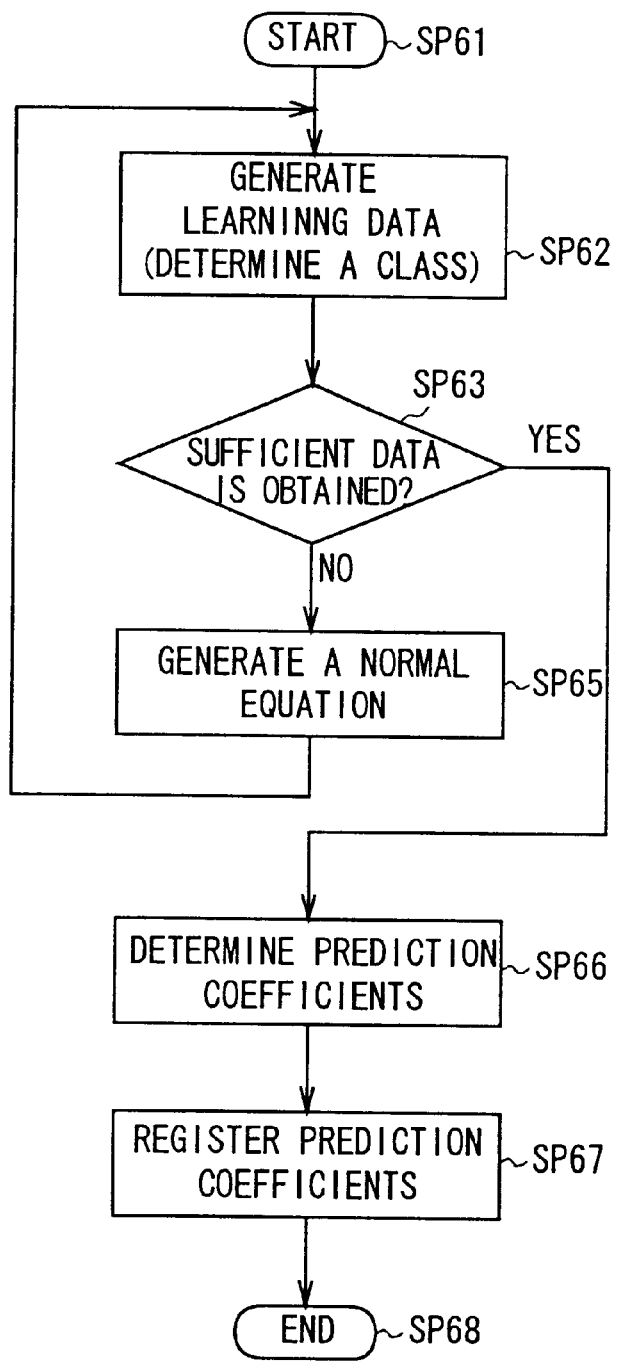
FIG. 5 is a flow chart showing a procedure of generating prediction coefficients.

A procedure of generating prediction coefficients by the learning circuit 60 will be described below with reference to the flow chart shown in FIG. 5. Starting with step SP61 and in step SP62, the learning circuit 60 generates SD image data S61 as a pupil signal from HD image data S60 as a teacher signal and thereby, generates learning data necessary to generate a prediction coefficient, and in addition, selects a class tap from the SD image data S61 to perform classification based on the signal level distribution.

Then, in step SP63, the learning circuit 60 judges whether or not learning data necessary and sufficient to generate prediction coefficients have been obtained. As a result, if it is judged that the necessary and sufficient learning data have not been obtained, a negative result is obtained in step SP63 and the process proceeds to step SP65.

In step SP65, the learning circuit 60 generates a normal equation in the form of the above-described equations (9) for each class, then returns to step SP62 and repeats the same processing procedure to generate normal equations necessary and sufficient to generate the prediction coefficients.

On the other hand, when the affirmative result is obtained in step SP63, the affirmative result indicates that necessary and sufficient learning data have been obtained, so the the learning circuit 60 proceeds to step SP66 and solves the normal equation constituted of the equations (9) using the sweeping-out method and thereby generates the prediction coefficients $w_1, w_2, \ldots, w_n$ for each class. In step SP67, the learning circuit 60 stores the prediction coefficients $w_1, w_2, \ldots, w_n$ generated for each class into the prediction coefficient ROM 54 and proceeds to step SP68 to terminate the processing.

(2) First Embodiment

Figure 6:
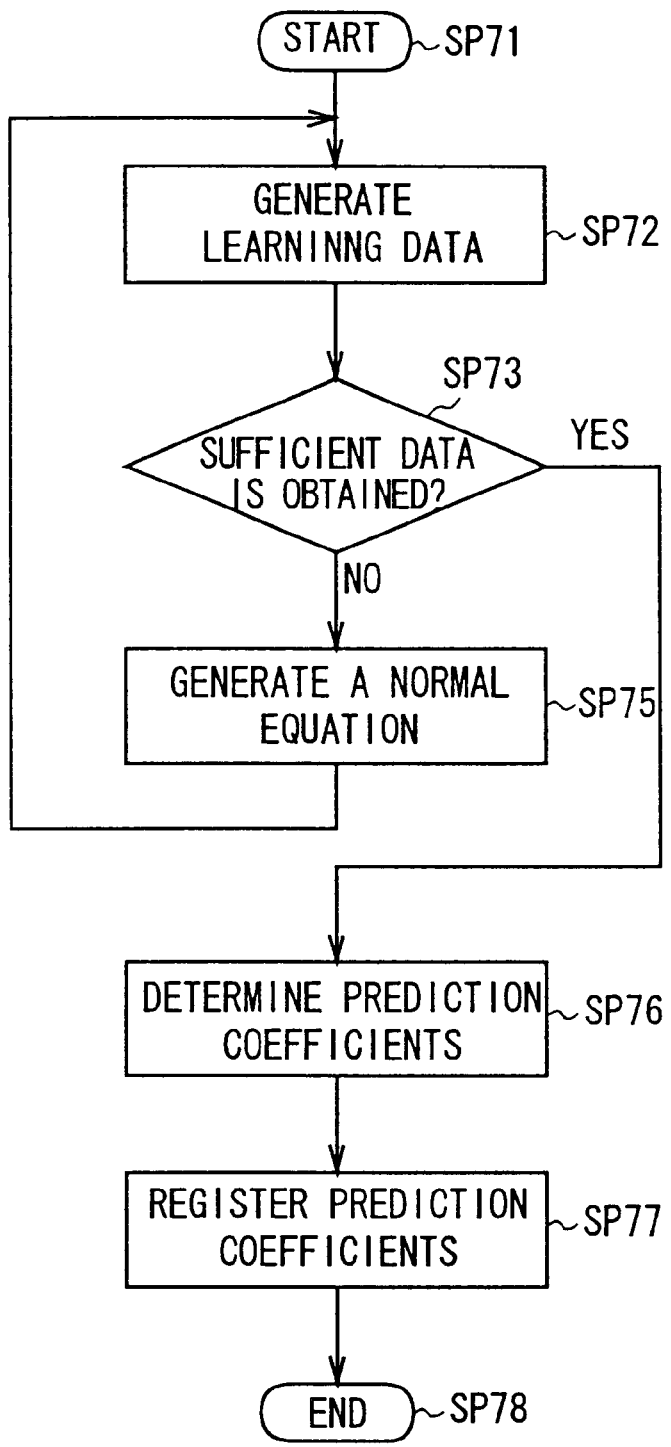
FIG. 6 is a flow chart showing a procedure of generating prediction coefficients according to a first embodiment.

A learning circuit functions so as to down-convert an HD image data as a teacher image into an SD image data as a pupil image, and generates prediction coefficients for each class by performing learning between the HD image data and the SD image data. Hereinafter, the procedure of generating prediction coefficients by the learning circuit 60 will be described with reference to the flow chart shown in FIG. 6.

Figure 7:
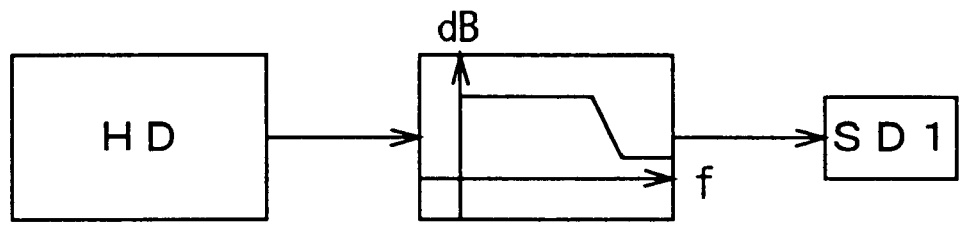
FIG. 7 is a schematic diagram explaining a first embodiment of down-conversion according to the present invention.
Figure 7:
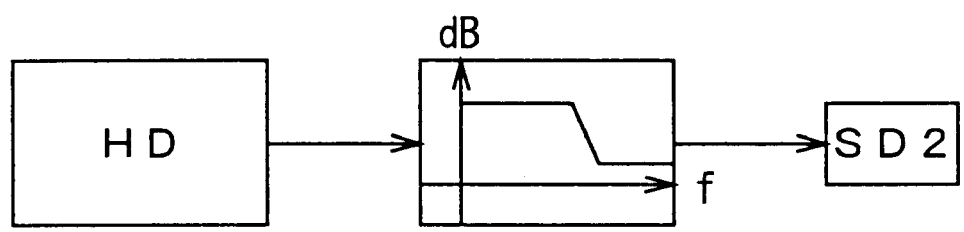
Figure 7:
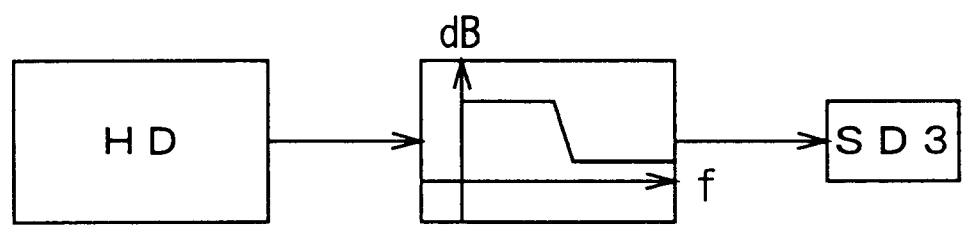
Figure 7:
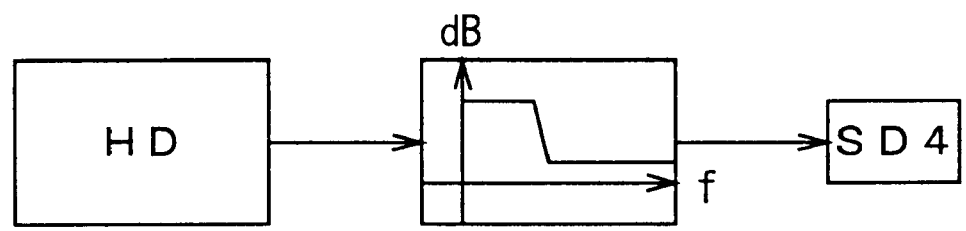

Starting with step SP71, in step SP72, the learning circuit generates learning data necessary for generation of prediction coefficients by generating SD image data as a pupil image from HD image data as a teacher image. In this step SP72, the learning circuit generates a plurality of SD image data SD1 to SD4 from one piece of HD image data HD using a plurality of down-filters F1 to F4 having pass-bands different from each other, as shown in FIG. 7. In this case, the down-filter F1 has the highest pass-band, and the pass-bands of the down-filters F2 to F4 are lowered in this order.

In step SP73, the learning circuit determines whether sufficient number of learning data to generate prediction coefficients is obtained. As a result, if it is determined that sufficient data is not obtained yet, a negative result is obtained in step SP73, so the processing proceeds to step SP75.

In step SP75, the learning circuit generates a normal equation in the form of the aforementioned equation (9) for each of SD image data SD1 to SD4, and then returns to step SP72 and repeats the same processing procedure. Thus, the number of normal equations sufficient and necessary to generate prediction coefficients is generated.

On the other hand, if an affirmative result is obtained in step SP73, this case means that sufficient number of learning data has been obtained, so the learning circuit proceeds to step SP76 and solves the normal equations, which have been generated in the aforementioned step SP75, by the sweeping-out method to generate a prediction coefficient for each SD image data SD1 to SD4.

Figure 8:
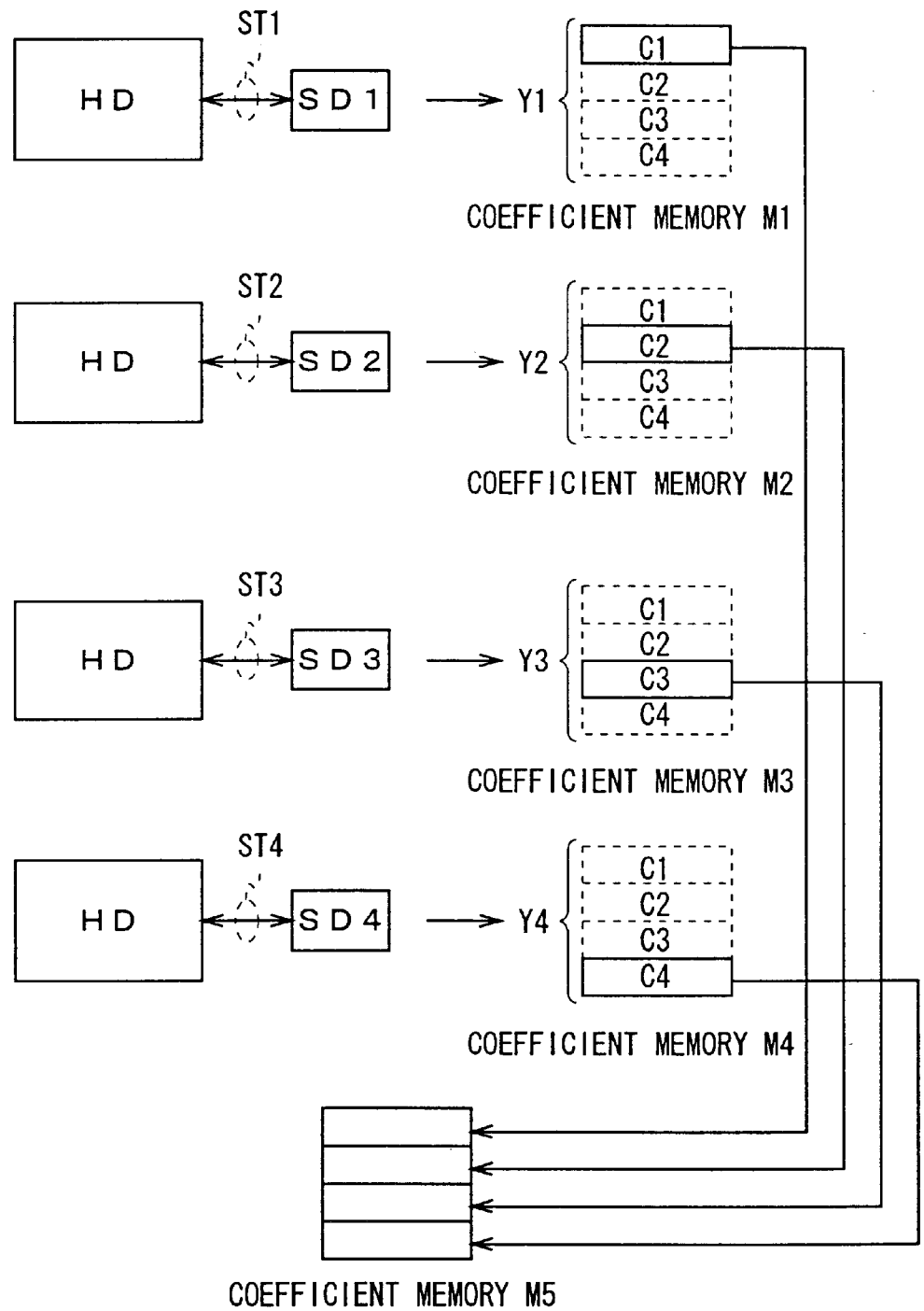
FIG. 8 is a schematic diagram explaining a first embodiment of a learning method and a coefficient memory according to the present invention.

In this step SP76, the learning circuit generates a prediction coefficient Y1 by performing learning ST1 between the HD image data HD and the SD image data SD1 and then, stores it in a coefficient memory M1, as shown in FIG. 8. Hereinafter, similarly, the learning circuit generates prediction coefficients Y2 to Y4 by performing learning ST2 to ST4 between the HD image data HD and the SD image data SD2 to SD4 and then, stores them into coefficient memories M2 to M4, respectively.

In a frequency characteristic of a down-filter F, it is desirable that a high pass-band is set in a small motion region of the HD image data HD, while a low pass-band is set in a large motion region thereof. Therefore, in step SP77 of FIG. 6, the learning circuit classifies the HD image data HD into four motion classes C1 to C4 based on a degree of motion in regions, and stores a prediction coefficient Y1 corresponding to the motion class C1 out of the prediction coefficients Y1 stored in the coefficient memory M1, into a prediction coefficient memory M5. Likewise, the learning circuit stores a prediction coefficient Y2 corresponding to the motion class C2 out of the prediction coefficients Y2 stored in the coefficient memory M2, into the coefficient memory M5, a prediction coefficient Y3 corresponding to the motion class C3 out of the prediction coefficients Y3 stored in the coefficient memory M3, into the coefficient memory M5, and a prediction coefficient Y4 corresponding to the motion class C4 out of the prediction coefficients Y4 stored in the coefficient memory M4, into the coefficient memory M5. In this way, it registers prediction coefficients in the coefficient memory M5, and then finishes the procedure of generating prediction coefficients in the following step SP78.

Figure 9:
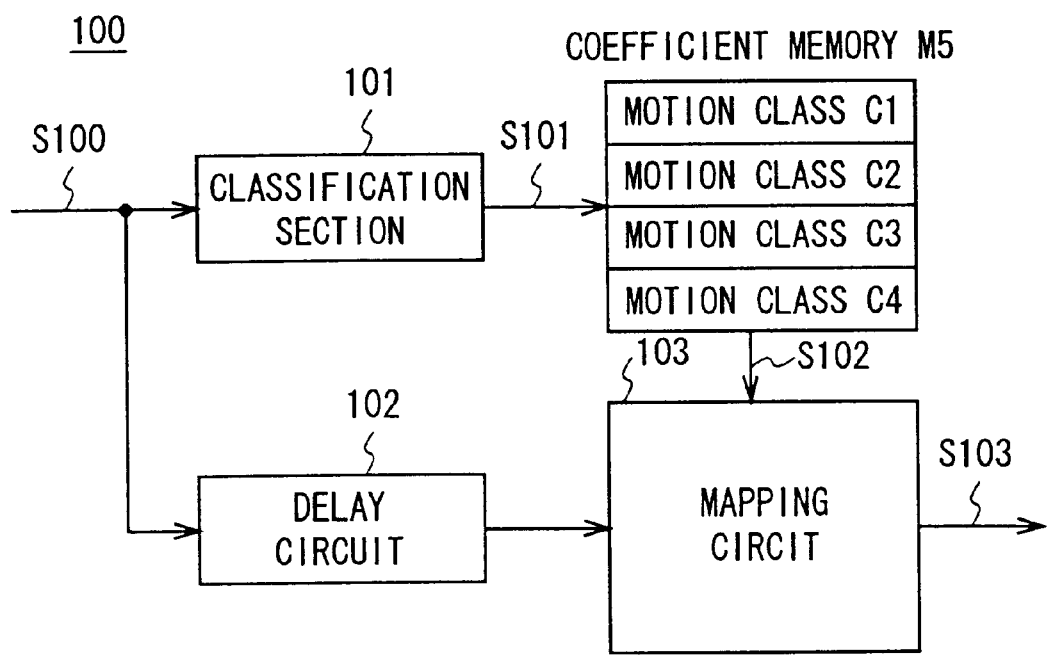
FIG. 9 is a block diagram showing a first embodiment of an up-converter according to the present invention.

FIG. 9 shows a configuration of an up-converter 100 adopting the coefficient memory M5 generated by the learning. The up-converter 100 enters input SD image data S100 to a classification section 101 and a delay circuit 102. The classification section 101 classifies the SD image data S100 to generate a class code S101 and sends it out to the coefficient memory M5.

The coefficient memory M5 reads out the prediction coefficient of a motion class C corresponding to the supplied class code S101 out of motion classes C1 to C4 and sends the prediction coefficient data S102 out to a mapping circuit 103. The delay circuit 102 delays the SD image data S100 for a predetermined time period, and sends it out to the mapping circuit 103. The mapping circuit 103 performs a product-sum operation of the SD image data S100 and the prediction coefficient data S102 to generate HD image data S103 and outputs it to an outside destination.

In the above-described configuration, the learning circuit generates a plurality of SD image data SD1 to SD4 from one piece of HD image data HD through a plurality of down-filters F1 to F4 having pass-bands different from each other, and thereafter, performs learning between the HD image data HD and the SD image data SD1 to SD4 to generate prediction coefficients Y1 to Y4, respectively. Then, the learning circuit extracts prediction coefficients corresponding to the motion classes C1 to C4 out of the prediction coefficients Y1 to Y4 and stores them into the coefficient memory M5. Thus, the learning circuit stores prediction coefficients corresponding to a degree of motion of the HD image data HD into the coefficient memory M5. Therefore, the HD image data S103 is generated using prediction coefficients corresponding to a degree of motion of the SD image data S100 and thereby, an image quality of the HD image data S103 is improved as compared with a case where mapping is performed using prediction coefficients generated by one down-filter as in a conventional way.

According to the above-described configuration, a plurality of prediction coefficients Y1 to Y4 are generated using a plurality of down-filters F1 to F4 having pass-bands different from each other, prediction coefficients corresponding to motion classes C1 to C4 are extracted out of the prediction coefficients Y1 to Y4 and stored into the coefficient memory M5, whereby the HD image data S103 can be generated using the prediction coefficients based on a degree of motion of the SD image data S100, so that an image quality of the HD image data S103 can further be improved as compared with a conventional case.

(3) Second Embodiment

Figure 10:
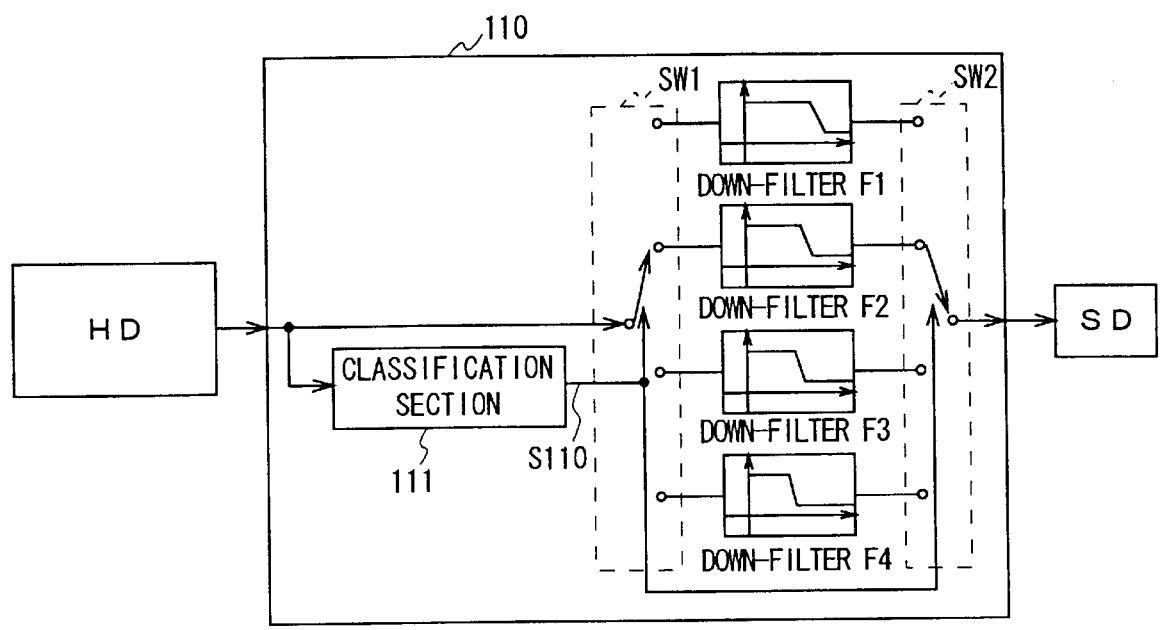
FIG. 10 is a schematic diagram explaining a second embodiment of the down-conversion according to the present invention.

FIG. 10, in which parts corresponding to those of FIG. 7 are indicated by the same marks, shows a configuration of a down-converter 110 according to the second embodiment. The down-converter 110 enters HD image data HD as a teacher image to a switch SW1 and a classification section 111. The classification section 111 generates class data S110 by classifying the HD image data HD into motion classes C1 to C4 corresponding to an amount of motion thereof and supplies the data to switches SW1 and SW2. In this case, the classification section 111 classifies image data having the smallest motion amount into the class C1, and as a motion amount is increased, image data are respectively classified into the classes C2 to C4 in this order, wherein an image data having the largest motion amount is classified into the class C4. Note that, the image signal conversion unit which performs classifications based on the motion amount is disclosed in Japanese Patent Laid Open No. 74543/97.

The switches SW1 and SW2 are selected while a plurality of down-filters F1 to F4 having pass-bands different from each other are adaptively changed over based on a motion class C shown by the supplied class data S110. The down-converter 110 down-converts the HD image data HD using a changed-over down-filter F to generate one piece of SD image data SD. At that point, if the HD image data HD has the small motion amount, the down-filter F1 having the high pass-band is selected, and as a motion amount is increased, the down-filter F2 to F4 having the lower pass-band in the order is selected. In this way, the down-converter 110 generates SD image data SD while adaptively conducting changeovers of a down-filter F according to a motion amount of the HD image data HD.

Figure 11:
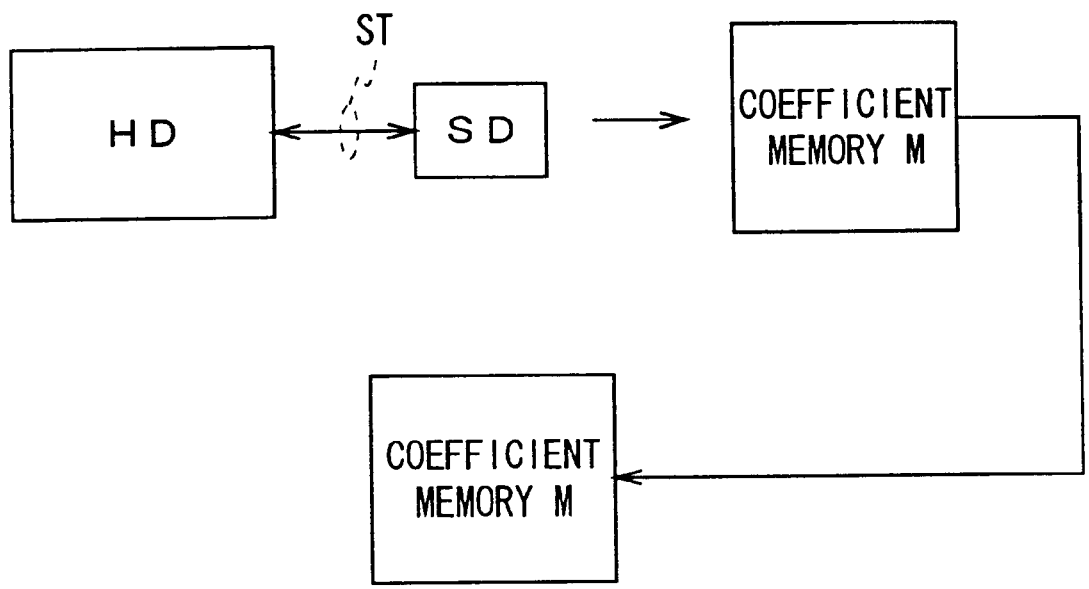
FIG. 11 is a schematic diagram explaining a second embodiment of the learning method and the coefficient memory according to the present invention.

Then, as shown in FIG. 11, the learning circuit generates a prediction coefficient Y by performing learning ST between HD image data HD as a teacher image and SD image data SD as a pupil image, and stores it into a coefficient memory M.

Figure 12:
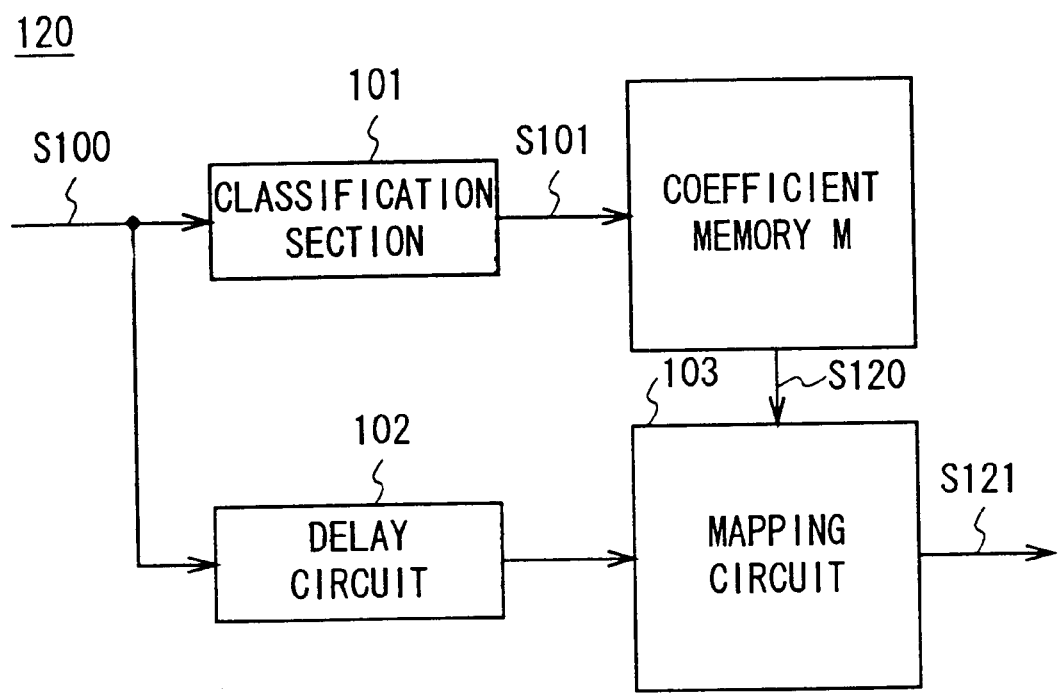
FIG. 12 is a block diagram showing the first embodiment of the up-converter of the present invention.

FIG. 12, in which parts corresponding to those of FIG. 9 are indicated by the same marks, shows a configuration of an up-converter 120 using the above-described coefficient memory M. The up-converter 120 enters input SD image data S100 to a classification section 101 and a delay circuit 102. The classification section 101 classifies the SD image data S100 into classes to generate a class code S101 and sends it out to the coefficient memory M.

Figure 13:
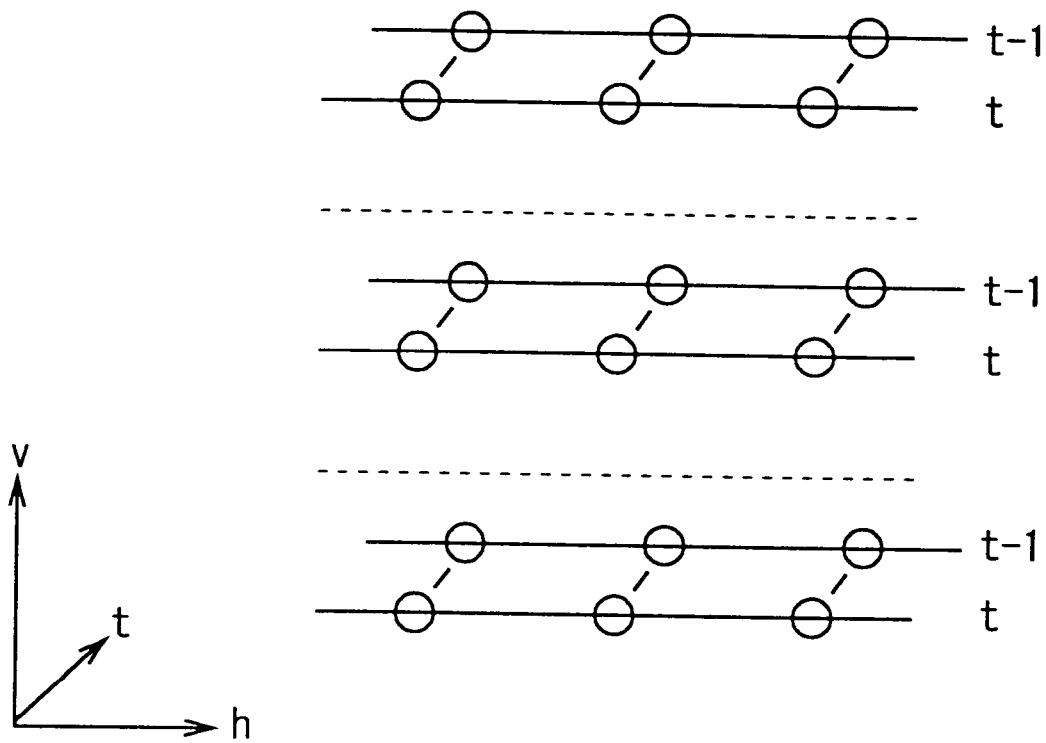
FIG. 13 is a schematic diagram shorting an example of arrangement of class taps in mapping.

The coefficient memory M reads out a prediction coefficient based on the supplied class code S101 and sends the prediction coefficient data S120 out to a mapping circuit 103. The delay circuit 102 delays the SD image data S100 for a predetermined time period and thereafter, sends it out to the mapping circuit 103. The mapping circuit 103 performs a product-sum operation of the SD image data S100 and the prediction coefficient data S120 to generate HD image data S121 and sends it out to an outside destination. Here, classification by the classification section 101 (FIG. 12) of the up-converter 120 will be described with reference to FIG. 13. The classification section 101 classifies the SD image data into four classes by considering nine pixels residing in the same field of SD image data and nine pixels in the preceding frame located at the same positions to obtain differences between pixels respectively in the frames, calculating the sum of absolute values thereof and judging the sum with a threshold value.

Figure 14:
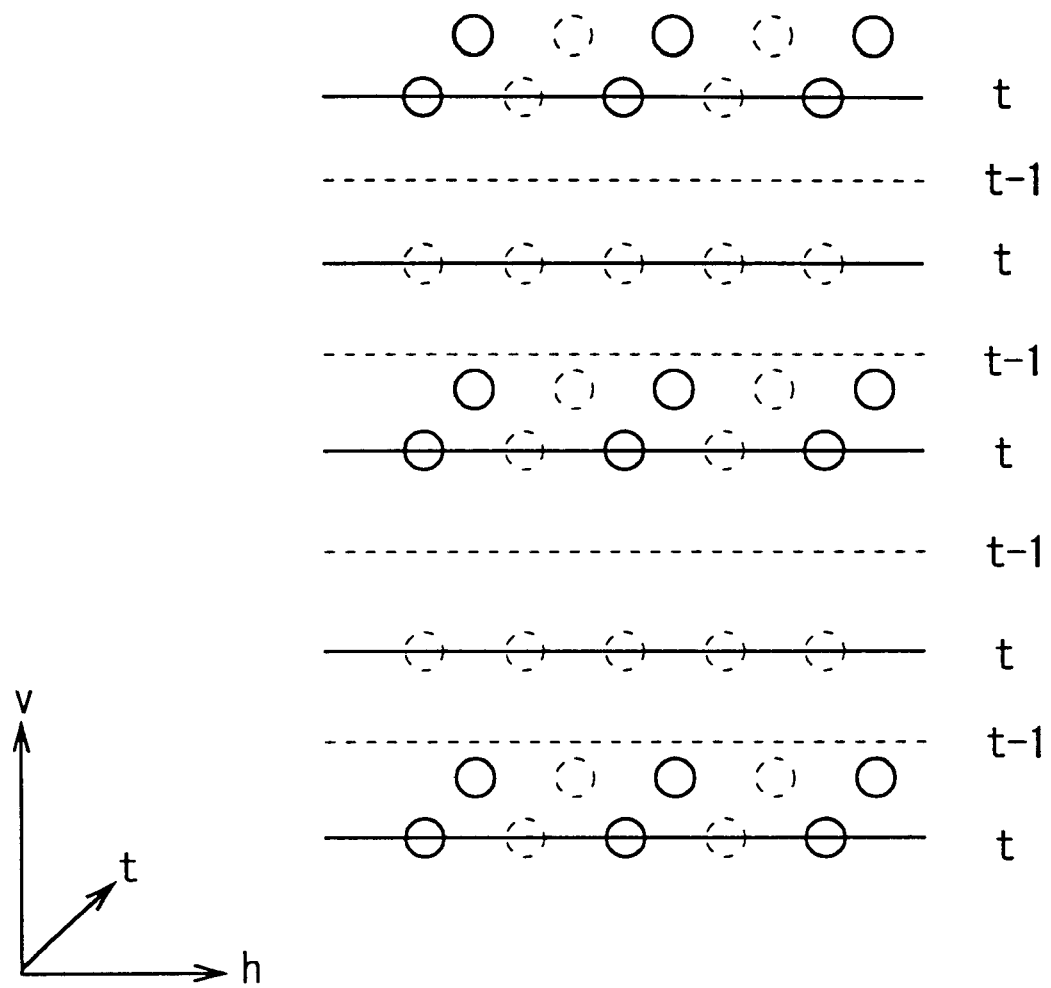
FIG. 14 is a schematic diagram showing an example of arrangement of class taps in down-conversion.

Next, classification by the classification section 111 (FIG. 10) of the down-converter 110 will be described with reference to FIG. 14. In the classification section 111, since HD image data having the number of pixels four times as large as the SD image data are classified, nine pixels are extracted, selecting every other pixel, in a region with the same area as in the case of the SD image data, and the sum of absolute values of the differences between pixels respectively in the frames is obtained to classify the HD image data into four classes.

Therefore, while there is a case where classes of SD image data classified by the classification section 101 of the up-converter 120 and classes of HD image data, which corresponds to the SD image data, classified by the classification section 111 of the down-converter 110 are not same as each other, mismatching between both sets of classes is negligibly small because classification is performed by extracting class taps from a region with the substantially same area.

In the above-described configuration, the down-converter 110 down-converts HD image data HD while adaptively conducting changeovers of down-filters F having a plurality of frequency characteristics based on a motion amount of the HD image data HD to generate one piece of SD image data SD. The learning circuit performs learning ST between the HD image data HD and the SD image data SD to generate a prediction coefficient and stores it into a coefficient memory M.

The classification section 101 of the up-converter 120 cannot classify all the SD image data S100 into classes with perfect correctness and it is a reality that perfect classification is difficult. Therefore, in the up-converter 100 according to the above-described first embodiment, even in a case where HD image data S103 is generated from SD image data S100 having a similar signal level distribution, correct classification is not achieved and there is a risk that mapping is effected using prediction coefficients generated with down-filters F whose frequency characteristics are totally different from being proper. In the case, values of the prediction coefficients are changed to a great extent, which deteriorates the image quality of the HD image data S103 to be generated.

On the other hand, in the up-converter 120 according to the second embodiment, even if an SD image data S100 with a similar signal level distribution is classified into different classes, prediction coefficients are not changed to a great extent and as a result, there is no chance of deterioration in image quality of the HD image data S121 to be generated.

Further, when learning ST is performed, time required for the learning ST is decreased since one piece of SD image data SD as a pupil image is only required to be used.

According to the above-described configuration, HD image data HD is classified and prediction coefficients are generated by converting the HD image data HD to the SD image data SD while adaptively conducting changeovers of down-filters F respectively with a plurality of frequency characteristics according to each class. Thereby, it can be avoided that prediction coefficients to be used are largely changed according to a class of the SD image data S100 when mapping is performed. Thus, an image quality can be further improved as compared with the case of the first embodiment.

(4) Other Embodiments

Note that, in the above-described embodiments, the present invention is applied to an image data conversion unit that generates HD image data S103 and S121 from SD image data S100. However, the present invention is not limited thereto and can be widely applicable to any of other image data conversion unites as far as the unit generates second data from first data.

Further, in the above-described embodiments, the cases where the learning circuit is employed to generate prediction data has been described. However, the present invention is not limited to the case, in short, another circuit can be employed as long as it can generate prediction data from teacher image data corresponding to second image data, using a plurality of filters having pass-bands different from each other.

Further, in the above-described embodiments, the cases where the coefficient memories M5 and M are employed as the prediction data storage means has been described. However, the present invention is not limited to the cases, but the present invention can be applicable to another prediction data storage means as far as the means stores prediction data.

Further, in the above-described embodiments, a case where the classification section 101 is employed to determine classes has been described. However, the present invention is not limited to the case, but the present invention can be applicable to another section as long as it extracts a plurality of pixels including a remarkable pixel from first image data and determines a class of the remarkable pixel from the extracted plurality of pixels.

Further, in the above-described embodiments, the cases where the coefficient memories M5 and M are employed to control reading-out has been described. However, the present invention is not limited to the cases, but the present invention can be applicable to another memory can be employed as long as it reads out prediction data corresponding to a determined class from the prediction data storage section.

Further, in the above-described embodiments, the case where the mapping circuit 103 is employed to generate pixel data has been described. However, the present invention is not limited to the case, but the present invention can be applicable to another circuit as long as it generates a remarkable pixel of second image data from prediction data read-out from a prediction data storage means.

Further, in the above-described embodiments, the present invention is applied to the image data conversion unit. However, the present invention is suitably applied to data which has relations with a plurality of close data (waves), such as voice.

Furthermore, in the above-described embodiments, the classification adapting processing according to the present invention is applied to the case of converting the number of pixels (spatial resolution), like SD-HD conversion. However, the present invention is not limited there to and is applicable to the case of generating temporal resolution as disclosed in Japanese Patent Laid Open No. 167991/93, the case of improving tone quality by making a sampling frequency higher as disclosed in Japanese Patent Laid Open No. 313251/98, the case of making a spatial resolution higher by increasing the number of quantum bits and generating a signal corresponding to the increase in the amount of information as disclosed in Japanese Patent Laid Open No. 85267/95, and the case of improving grainy of images as disclosed in Japanese Patent Laid Open No. 123021/98.

As described above, according to the present invention, prediction data is generated from teacher image data corresponding to second image data using a plurality of filters having pass-bands different from each other and thereby, the second image data can be generated using prediction data corresponding to characteristics of first image data, which enables further improvement of an image quality as compared with a conventional case.

Industrial Applicability

The present invention is suitably applied to an image data conversion unit for generating image data having high resolution from image data having low resolution and an arithmetic unit for computing prediction coefficients which are used for the conversion processing.

What is claimed is:

1. An arithmetic apparatus for computing prediction coefficients which are used to convert first image data into second image data having higher quality than the first image data, comprising:
    a class determining section for classifying teacher image data having higher quality than said first image data, into a plurality of classes based on its characteristics;
    a pupil image data generating section for generating pupil image data having the same quality as said first image data by performing filtering processing different in each of the classes determined by said class determining section, on said teacher image data; and
    a prediction coefficient generating section for generating said prediction coefficients based on said pupil image data and said teacher image data.

2. The arithmetic apparatus according to claim 1, wherein said second image data and said teacher image data have higher resolution than said first image data.

3. The arithmetic apparatus according to claim 1, wherein said second image data and said teacher image data have a number of pixels that is more than the number of pixels of said first image data.

4. The arithmetic apparatus according to claim 2, wherein said second image data and said teacher image data have the same number of pixels.

5. The arithmetic apparatus according to claim 1, wherein said prediction coefficient generation section generates said prediction coefficient by performing learning between said pupil image data and said teacher image data.

6. The arithmetic apparatus according to claim 1, wherein said pupil image data generating section performs said filtering processing having pass-bands different in each of said classes determined by said class determining section, on said teacher image data.

7. The arithmetic apparatus according to claim 6, wherein said prediction coefficient generating section generates prediction coefficients different in each of said classes.

8. The arithmetic apparatus according to claim 7, wherein said pupil image data generating section generates said pupil image data by performing filtering processing using down-filters having pass-bands different in each of classes determined by said class determining section.

9. The arithmetic apparatus according to claim 1, wherein said class determining section classification said teacher image data as any of said plurality of classes with motion of said teacher image data as said characteristics.

10. An arithmetic method of computing prediction coefficients which are used to convert first image data into second image data having higher quality than the first image data, comprising the steps of:
    classifying teacher image data having higher quality than said first image data into a plurality of classes based on its characteristics;
    generating pupil image data having the same quality as said first image data by performing filtering processing different in each of said classified classes, on said teacher image data; and
    generating said prediction coefficients based on said pupil image data and said teacher image data.

11. The arithmetic method according to claim 10, wherein said second image data and said teacher image data have higher resolution than said first image data.

12. The arithmetic method according to claim 10, wherein said second image data and said teacher image data have a number of pixels which is more than the number of pixels of said first image data.

13. The arithmetic method according to claim 11, wherein said second image data and said teacher image data have the same number of pixels.

14. The arithmetic method according to claim 10, wherein in the step of generating said prediction coefficients, said prediction coefficients are generated by performing learning between said pupil image data and said teacher image data.

15. The arithmetic method according to claim 10, wherein said in the step of generating said pupil image data, said filtering processing having pass-bands different in each of said classes determine in the step of performing classification into said plurality of classes, is performed on said teacher image data.

16. The arithmetic method according to claim 15, wherein said in the step of generating said prediction coefficients, different prediction coefficients different in each of said classes are generated.

17. The arithmetic method according to claim 16, wherein said in the step of generating said pupil image data, said pupil image data is generated by performing filtering processing using down-filters having pass-bands different in each classes determined in the step of performing classification into said plurality classes.

18. The arithmetic method according to claim 10, wherein said in the step of performing classification into said plurality of classes, said teacher image data is classified as any of said plurality of classes, with motion of said teacher image data as said characteristics.

19. A conversion apparatus for converting first image data into second image data having higher quality than the first image data, comprising:
    a storage section for storing prediction coefficients for each of a plurality of classes;
    a class determining section for determining a class to which said first image data corresponds, out of said plurality of classes based on its characteristics; and
    a converting section for converting said first image data into said second image data based on a prediction coefficient corresponding to the class determine by said class determining section, wherein said prediction coefficients stored in said storage section are generated by previously performing the steps of:

classifying teacher image data having higher quality than said first image data into a plurality of classes based on its characteristics;

generating pupil image data having the same quality as said first image data by performing filtering processing different in each of said classified classes, on said teacher image data; and performing learning based on said pupil image data and said teacher image data.

20. The conversion apparatus according to claim 19, wherein said second image data and said teacher image data have higher resolution than said first image data.

21. The conversion apparatus according to claim 19, wherein said second image data and said teacher image data have a number of pixels that is more than the number of pixels of said first image data.

22. The conversion apparatus according to claim 20, wherein said second image data and said teacher image data have the same number of pixels.

23. The conversion apparatus according to claim 19, wherein in the step of generating said pupil data, said filtering processing having pass-bands different in each of said classes determined in the step of performing classification into said plurality of classes, is performed on said teacher image data.

24. An arithmetic apparatus for computing prediction coefficients which are used to convert first data into second data having higher quality than the first data, comprising:

a class determining section for classifying teacher data having higher quality than said first data, into a plurality of classes based on its characteristics;

pupil data generating section for generating pupil image data having the same quality as said first data by performing filtering processing different in each of classes determined by said class determining section, on said teacher data; and prediction coefficient generating section for generating said prediction coefficients based on said pupil image data and said teacher data.

25. The arithmetic apparatus according to claim 24, wherein said first data has the first number of data, said second data has the second number of data more than said first number of data, and said teacher data has the third number of data more than said first number of data.

26. The arithmetic apparatus according to claim 25, wherein said second number of data and said third number of data are the same.

27. The arithmetic apparatus according to claim 24, wherein said prediction coefficient generating section generates said prediction coefficients by performing learning between said first data and said teacher data.

28. The arithmetic apparatus according to claim 24, wherein said pupil data generating section performs said filtering processing having pass-bands different in each of said classes determined by said class determining section, on said teacher image data.

29. The arithmetic apparatus according to claim 28, wherein said prediction coefficient generating section generates prediction coefficients different in each of said classes.

30. The arithmetic apparatus according to claim 29, wherein said pupil data generating section generates said pupil data by performing filtering processing using down-filters having pass-bands different in each of classes determined by said class determining section.

31. The arithmetic apparatus according to claim 24, wherein said first data has a correlation in a predetermined area.

32. An arithmetic method of computing prediction coefficients which are used to convert first data into second data having higher quality than the first data, comprising the steps of classifying teacher data having higher quality than said first data into a plurality of classes based on its characteristics;

generating pupil data having the same quality as said first data by performing filtering processing different in each of classified classes, on said teacher data; and generating said prediction coefficients based on said pupil data and said teacher data.

33. The arithmetic method according to claim 32, wherein said first data has the first number of data, said second data has the second number of data more than said first number of data, and said teacher data has the third number of data more than said first number of data.

34. The arithmetic method according to claim 33, wherein said second number of data and said third number of data are the same.

35. The arithmetic method according to claim 32, wherein in the step of generating said prediction coefficients, said prediction coefficients are generated by performing learning between said pupil data and said teacher data.

36. The arithmetic method according to claim 35, wherein in the step of generating said prediction coefficients, prediction coefficients different in each of said classes are generated.

37. The arithmetic method according to claim 36, wherein in the step of generating said pupil data, said pupil data is generated by performing filtering processing using down-filters having pass-bands different in each of said classes determined in the step of performing classification into said plurality of classes.

38. A conversion apparatus for converting first data into second data having higher quality than said first data, comprising:

a storage section for storing prediction coefficients for each of a plurality of classes;

a class determining section for determining a class to which said first data corresponds, out of said plurality of classes based on its characteristics; and a converting section for converting said first data into said second data based on a prediction coefficient corresponding to the class determine by said class determining section, wherein said prediction coefficients stored in said storage section are generated by previously performing the steps of:

classifying teacher data having higher quality than said first data into a plurality of classes based on its characteristics;

generating pupil data having the same quality as said first data by performing filtering processing different in each of said classified classes, on said teacher data; and performing learning based on said pupil data and said teacher data.

39. The conversion apparatus according to claim 38, wherein said first data has the first number of data, said second data has the second number of data more than said first number of data, and said teacher data has the third number of data more than said first number of data.

40. Then conversion apparatus according to claim 39, wherein said second number of data and said third number of data are the same.

* * * * *